United States Patent [19]

Sandstrom

[11] Patent Number: 5,021,493

[45] Date of Patent: Jun. 4, 1991

[54] RUBBER COMPOSITION AND TIRE WITH COMPONENT(S) THEREOF

[75] Inventor: Paul H. Sandstrom, Tallmadge, Ohio

[73] Assignee: The Goodyear Tire & Rubber Company, Akron, Ohio

[21] Appl. No.: 496,726

[22] Filed: Mar. 21, 1990

[51] Int. Cl.$^5$ .................. C08L 7/00; C08L 9/00; C08K 5/05

[52] U.S. Cl. .................. 524/347; 152/209 R; 524/323; 525/384

[58] Field of Search .............. 524/335, 337, 323, 347; 525/384; 152/209 R

[56] References Cited

U.S. PATENT DOCUMENTS

| | | | |
|---|---|---|---|
| 3,882,065 | 5/1975 | Snow, Jr. et al. | 524/347 |
| 3,931,090 | 1/1976 | Amatangelo | 524/347 |
| 3,953,531 | 4/1976 | Ohi | 524/347 |
| 4,454,283 | 5/1984 | Street et al. | 524/347 |

*Primary Examiner*—Allan M. Lieberman
*Attorney, Agent, or Firm*—Henry C. Young, Jr.

[57] ABSTRACT

A sulfur curable rubber compound containing a 2,5-diorganohydroquinone. The invention particularly relates to a pneumatic rubber tire having at least one component compound of such rubber compound.

17 Claims, No Drawings

RUBBER COMPOSITION AND TIRE WITH COMPONENT(S) THEREOF

FIELD

This invention relates to compounded rubber containing a modified or substituted hydroquinone. The invention further relates to a tire having a tread composed of such rubber composition.

BACKGROUND

For uses in rubber tires, particularly tire treads, rubber is often compounded to enhance various properties. For example, for a tire tread, a balance between rolling resistance, which may affect fuel economy of the vehicle with which the tire is associated, and skid resistance and tire tread wear is desired. Usually, if one of such three properties of the tire tread is emphasized, enhanced or otherwise modified, then one or more of the other two properties is effected. It is often a tire compounder's desire to enhance one of the three properties without unduly sacrificing one or more of the other two properties.

While it is usually time consuming and relatively expensive to conduct extensive tire tests for the purpose of evaluating the results of a rubber compounding experiment for a tire component such as its tread, often preliminary predictive tests are made on the rubber compound itself for the material properties which are often associated with what can be expected from an extensive tire test relating to the aforesaid three tire properties.

For example, the rebound value of a compounded rubber sample is often predictive of the rolling resistance of a tire with a tread thereof. A relatively higher rebound value of a rubber compound determined according to ASTM No. D1054 would typically indicate a lower tire rolling resistance for a tire with a tread thereof as compared with a similar rubber compound with a relatively lower rebound value. A rubber compound having a relatively lower rebound value would be similarly predictive of a tire having a tread thereof with a higher and often less desirable rolling resistance.

DISCLOSURE AND PRACTICE OF THE INVENTION

In accordance with this invention, a sulfur curable rubber composition is provided which is comprised of at least one of natural rubber and synthetic rubber and containing, based on 100 parts by weight of said rubbers, from about 0.5 to about 5, preferably 1 to about 3 parts by weight of diorganohydroquinone having the structure:

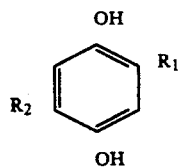

where $R_1$ and $R_2$ are the same or different hydrocarbon radicals containing from 1 to 20 carbon atoms selected from alkyl and cycloalkyl radicals, preferably as their saturated form, and more preferably branched saturated alkyl radicals, containing 3 to 20, more preferably 4 to 6, carbon atoms: and from aryl and hydrocarbon substituted aryl radicals (alkylaryl radicals) and aralkyl radicals containing from 6 to 20 carbon atoms. Preferably, the radicals are selected from alkyl radicals and more preferably, branched saturated alkyl radicals.

Representative examples of alkyl radicals are methyl, ethyl, propyl, butyl, amyl, hexyl, heptyl octyl, nonyl and decyl radicals including isomeric forms thereof, particularly tertiary radical forms.

A preferred 2,5-diorganohydroquinone is a ditertiaryalkylhydroquinone where said alkyl groups contain 4 to 6 carbon atoms.

A particularly preferred modified hydroquinone is 2,5-ditertiary-amyl hydroquinone.

Such rubber composition is conventionally submitted to curing conditions of heat and pressure.

In further accordance with this invention, a pneumatic rubber tire is provided containing at least one component as the rubber composition of this invention.

More specifically, a pneumatic rubber tire is provided having at least one of its carcass or sidewall components as containing the rubber composition of this invention. For example, the tire carcass may contain the rubber composition of this invention as a plycoat for its fabric reinforcement.

In further accordance with this invention, a pneumatic rubber tire is provided having a tread composed of said sulfur cured rubber composition.

It is to be appreciated that the tread for a pneumatic rubber tire is often composed of a cap/base construction. The tread rubber cap, in such case, is the outer ground contacting part of the tread which contains designed grooves and raised portions and is typically compounded to enhance, for example, tire traction and treadwear. The tread rubber base, in such case, is positioned beneath the tread cap, between the cap and tire carcass, and is typically compounded to enhance heat durability. Of course, a tire tread may simply be all of one rubber compound without a cap/base construction. Such tread constructions are well known to those skilled in such art.

In the practice of this invention, while the rubber composition is preferably directed to the tire tread, it is particularly preferred for application and utilization as a pneumatic rubber tire tread base in a tread cap/base construction.

In the practice of this invention, the natural rubber is cis 1,4-polyisoprene and synthetic rubbers are, for example, cis 1,4-polyisoprene (synthetic), 3,4-polyisoprene, cis 1,4-polybutadiene, styrene/butadiene copolymers, styrene/isoprene/ butadiene terpolymers and butadiene/acrylonitrile copolymers. Also contemplated, although usually somewhat less preferred, and if used in a tire tread or carcass component, then if used therein, as a minor component thereof, are EPDM rubbers (ethylene, propylene and minor amount of conjugated diene terpolymers) and butyl (including halobutyl as a butyl-type rubber) rubbers (copolymers of isobutylene and minor amount of isoprene). Typical halobutyl rubbers are chlorobutyl and bromobutyl rubbers.

Thus, in the practice of this invention, a pneumatic tire is provided having a tread composed of a sulfur cured rubber composition of at least one of natural rubber and synthetic rubber and containing, based on 100 parts by weight of said rubbers, about 0.5 to about 5, preferably about 1 to about 3, parts by weight of said 2,5-organohydroquinone and particularly 2,5-ditertiary-amylhydroquinone.

In the practice of this invention, it is typically desired to prepare the rubber compound by mixing the said modified hydroquinone in the first, or nonproductive stage of mixing together with other typical compounding ingredients exclusive of sulfur and vulcanization accelerator curatives following which curatives, such as sulfur and vulcanization accelerators, are added during the next productive mixing stage, although incremental addition of the modified hydroquinone can be made in both stages, if desired. Such multiple stage mixing procedures, particularly two stage mixing steps, are well known to those having skill in the rubber mixing art. Preferably essentially all of the modified hydroquinone is added in the first, nonproductive mix stage.

In the practice of this invention, it has been observed that the addition of the said modified hydroquinone has provided a special benefit by enabling an easier and more efficient processing of the compounded rubber and a benefit for the ultimately cured compounded rubber such as a higher rebound value without significant loss of other cured properties. A acceptable suitable cure behavior for the rubber composition was also maintained when the modified hydroquinone was added during the nonproductive stage of mixing.

It is to be understood that the other various additives can be and are typically utilized to prepare the rubber composition including carbon black, processing oils, sulfur-cure accelerators as well as retarders, antidegradants, zinc oxide, zinc stearate or stearic acid, and various other pigments, if desired. Such compounding of rubber is well known to those having skill in such art. Antidegradants are typically of the amine or phenolic type while stearic acid is typically referred to as a rubber compounding ingredient, the ingredient itself is usually obtained and used as a mixture of organic acids primarily composed of stearic acid with at least one of oleic acid, linolenic acid and palmitolic and/or palmitic acid. The mixture may contain minor amounts (less than about six weight percent) of myristic acid, arachidic acid and/or arachidonic acid. Such material or mixture is conventionally referred to in the rubber compounding art as stearic acid.

Where normal or typical rubber compounding amounts or ranges of amounts of such additives are used, they are not otherwise considered as a part of the invention. For example, some of the ingredients might be classified, in one aspect, as processing aids. Such processing aids may be, for example, rubber processing oil such as paraffinic, napthenic and aromatic processing oils typically used in the range of about 2 to about 10 phr; waxes such as microcrystalline and paraffinic waxes typically used in a range of about 1-5 phr and often in a range of about 1 to about 3 phr; and resins, usually as tackifiers, such as, for example, synthetic hydrocarbon and natural resins typically used in a range of about 1-5 phr and often in a range of about 1 to about 3 phr. A curative might be classified as a combination of sulfur and sulfur cure accelerator(s) for the rubber compound (usually simply referred to as accelerator) or a sulfur donor/accelerator. In a sulfur and accelerator(s) curative, the amount of sulfur used is in a range of about 0.5 to 5 phr and usually in a range of about 0.5 to about 3 phr: and the accelerator(s), often of the sulfenamide type, is (are) used in a range of about 0.5 to about 3 phr and often in a range of about 1 to about 2 phr. The term "phr" refers to parts by weight of the referenced ingredient per one hundred parts by weight of rubber in the rubber composition. Such term is commonly used in the rubber compounding art.

After mixing, the compounded rubber can be fabricated into various products, including a tire tread for example, and cured under conditions of heat and pressure by methods well-known to those having skill in such art.

In the practice of this invention, although the addition of the modified hydroquinone and its effect on the rubber compound itself may not be entirely understood, it is visualized that its effect might be summarized as an interaction with polymer chains which might have been cleaved during mixing by shear or chemical reaction to form hydroquinone terminated chain ends or as a preventative to retard additional chain cleavage from free radical reactions.

The practice of this invention is further illustrated by reference to the following examples which are intended to be representative rather than restrictive of the scope of the invention. Unless otherwise indicated, all parts and percentages are by weight.

EXAMPLE I

Rubber compositions containing the materials shown in Table 1 were prepared in a rubber mixer using two separate stages of addition. One rubber composition is identified as Control (A) and another rubber composition containing 2,5-ditertiary-amyl hydroquinone identified as Experimental (B). The materials for the first or nonproductive stage were mixed at temperatures above 150° C., whereas the remaining (curative) materials were mixed therewith as a second or productive stage to a final temperature of below 110° C. The 2,5-ditertiary-amyl hydroquinone was added to the experimental compound (B) during the first, or nonproductive, stage.

The cure behavior and vulcanizate properties for the Control (A) and the Experimental (B) rubber compound are compared in Table 2. The results clearly indicate that the experimental rubber compound had a lower hysteresis value than the control as measured by dynamic resilience and rebound values. Other cured properties including cure behavior are similar for both compounds.

TABLE 1

| | Parts Control (A) | Exp (B) | Mixing Stage of Addition[1] |
|---|---|---|---|
| Natural Rubber | 50.0 | 50.0 | 1 |
| Cis 1,4-Polybutadiene | 25.0 | 25.0 | 1 |
| Styrene/Butadiene Rubber | 34.4 | 34.4 | 1 |
| Carbon Black | 60.0 | 60.0 | 1 |
| Processing Aids | 6.0 | 6.0 | 1 |
| Antidegradants | 3.0 | 3.0 | 1 |
| Zinc Oxide | 3.0 | 3.0 | 1 |
| Stearic Acid | 2.5 | 2.5 | 1 |
| 2,5-ditertiary-amyl hydroquinone | 0 | 1.0 | 1 |
| Sulfur & Accelerator(s) | 4.0 | 4.0 | 2 |

[1]First, nonproductive, (1) or second, productive, (2) stage of mixing

TABLE 2

| Cure Behavior and Vulcanizate Properties[1] | | |
|---|---|---|
| | Control A | Exp. B |
| 2,5-ditertiary-amyl hydroquinone | 0 phr[4] | 1.0 phr[4] |
| Rheometer, 150° C. | | |
| Maximum Torque | 58.6 | 59.1 |

TABLE 2-continued

Cure Behavior and Vulcanizate Properties[1]

|  | Control A | Exp. B |
|---|---|---|
| Minimum Torque | 12.8 | 13.6 |
| T$_{90}$ minutes[2] | 16.0 | 14.5 |
| T$_{25}$ minutes[3] | 6.0 | 5.3 |
| Stress Strain | | |
| Tensile Strength, MPa | 18.3 | 18.4 |
| Elongation at Break, % | 505 | 455 |
| 300% Modulus, MPa | 9.4 | 10.4 |
| Rebound | | |
| Room Temperature (approx 22° C.), % | 52.9 | 55.4 |
| 100° C., % | 62.5 | 66.8 |
| Dynamic Properties, 100° C. | | |
| Modulus, kg/cm$^2$ | 96.5 | 90.0 |
| Resilience, % | 35.3 | 40.2 |
| Internal Viscosity, Kp | 42.6 | 34.5 |
| Hx | 160.6 | 138.3 |
| Hf | 77.2 | 76.4 |

[1] samples cured 18 minutes @ 150° C.
[2] time to reach 90% of maximum torque, a standard test.
[3] time to reach 25% of maximum torque, a standard test.
[4] parts per 100 parts rubber, by weight.

which might be expected to cause compound scorch during subsequent rubber mixing and processing. These results indicate that it would be more desirable to add the hydroquinone material during the first stage of mixing to prevent scorch or premature curing of the compound during subsequent processing.

TABLE 3

|  | Weight Parts | Stage of Addition |
|---|---|---|
| Natural Rubber | 100 | 1 |
| Carbon Black | 50 | 1 |
| Processing Aids | 5.5 | 1 |
| Antidegradants | 4 | 1 |
| Zinc Oxide | 4 | 1 |
| Fatty Acid | 2 | 1 |
| 2,5-ditertiary-amyl[1] Hydroquinone[2] | see notes | 1 or 2 |
| Sulfur & Accelerator(s) | 4.0 | 2 |

[1] the first, or nonproductive mixing stage is indicated as stage No. 1 and the second, or productive mixing stage is indicated as stage No. 2.
[2] The modified hydroquinone amounts added as shown in the following Table 4.

TABLE 4

Cure Behavior and Vulcanizate Properties[1]

|  | Control (C) | Experiments | | | | |
|---|---|---|---|---|---|---|
|  |  | (D) | (E) | (F) | (E-1) | (F-1) |
| 2,5-ditertiary-amyl hydroquinone | none | 0.5 | 1 | 2 | 2 | 2 |
| Stage of Addition | — | 1 | 1 | 1 | 2 | 2 |
| Rheometer, 150° C. (D2705) | | | | | | |
| Maximum Torque | 42.6 | 43.3 | 43.7 | 44.4 | 43.0 | 44.5 |
| Minimum Torque | 9.4 | 10 | 10.1 | 10.2 | 10.2 | 13.7 |
| T$_{90}$, minutes | 12 | 12.3 | 11.9 | 9.5 | 6.8 | 6.1 |
| T$_{25}$, minutes | 9 | 9.2 | 8.8 | 6.1 | 3.5 | 2.4 |
| Stress Strain (D412) | | | | | | |
| Tensile Strength, MPa | 27.1 | 26.7 | 27.1 | 27.1 | 27.8 | 26.2 |
| Elongation at Break, % | 550 | 530 | 540 | 520 | 560 | 490 |
| 300% Modulus MPa | 12.3 | 12.8 | 13.2 | 13.7 | 13.2 | 14.8 |
| Rebound (1054) | | | | | | |
| Room Temp (22° C.), % | 52.4 | 52.1 | 53.6 | 52.4 | 53.0 | 54.8 |
| 100° C., % | 63 | 65 | 64 | 64.7 | 65 | 67.6 |

[1] samples cured 18 minutes @ 150° C.

EXAMPLE II

A rubber composition containing the materials shown in Table 3 was prepared in a rubber mixer using the mix procedures described in Example I. The 2,5-ditertiary-amyl hydroquinone was added in various amounts to the first or to the second stage of mixing.

The cure behavior and vulcanizate properties for the control and the experimental compounds are compared in Table 4. The addition of the modified hydroquinone material during the first nonproductive stage of mixing was observed to provide a higher rebound value (measured at 100° C.). The rebound value was basically unaffected when the hydroquinone in amounts of 0.5, 1.0 and 2.0 phr were added, but the cure rate of the rubber as measured by T$_{90}$ (time to 90% of cure) and T$_{25}$ (time to 25% of cure) become progressively lower with increasing amounts of the hydroquinone.

When the modified hydroquinone was added during the productive or second stage of mixing the rebound value (100° C.) was observed to significantly increase but the T$_{90}$ and T$_{25}$ cure rate values sharply decreased It is readily observed, as the T$_{90}$ and T$_{25}$ values demonstrate, that it is more beneficial to add all or most of the modified hydroquinone in the first, or nonproductive, stage of mixing because addition during the second stage may produce a scorchy stock and, therefore, may require the addition of a retarder to the rubber compound.

EXAMPLE III

A rubber composition containing the materials set out in Table 5 was prepared in a rubber mixer using the mix procedures described in Example I. The 2,5-ditertiary-amyl hydroquinone was added to the experimental compound during the first or non-productive stage.

The cure behavior and vulcanizate properties for the control and the experimental compound are compared in Table 6. The control compound has higher hysteresis than the experimental compound as shown by the lower rebound value for the control compound. Cure behavior and stress strain properties are similar for both compounds.

TABLE 5

| | Weight Parts | Stage of Addition |
|---|---|---|
| Natural Rubber | 40 | 1 |
| Cis 1,4-Polybutadiene Rubber | 60 | 1 |
| Carbon Black | 50 | 1 |
| Processing Aids | 12.5 | 1 |
| Antidegradants | 4.0 | 1 |
| Zinc Oxide | 3.0 | 1 |
| Fatty Acid | 1.0 | 1 |
| 2,5-ditertiary-amyl Hydroquinone[1] | — | 1 |
| Sulfur Plus Accelerator(s) | 2.9 | 2 |

[1] The modified hydroquinone was added in an amount shown in the following Table 5A.

TABLE 5A

| | Experiment | |
|---|---|---|
| Modified Hydroquinone | Control (G) | (Exp. H) |
| 2,5-ditertiary-amyl Hydroquinone (phr) | 0 | 1.0 |

TABLE 6

Cure Behavior and Vulcanizate Properties[1]

| | Control (G) | Exp (H) |
|---|---|---|
| Rheometer, 150° C. | | |
| Maximum Torque | 33.3 | 35.3 |
| Minimum Torque | 9.4 | 9.5 |
| $T_{90}$ minutes | 23.5 | 20.2 |
| $T_2$ minutes | 8 | 7.6 |
| Stress Strain | | |
| Tensile Strength, MPa | 15.1 | 14.8 |
| Elongation at Break, % | 646 | 644 |
| 300% Modulus, MPa | 5.8 | 5.5 |
| Rebound | | |
| 100° C, % | 70 | 73.5 |

[1] samples cured 36 minutes @ 150° C.

EXAMPLE IV

Truck tires of size 295/75R22.5 were prepared with a tread composed of 100 phr natural rubber, carbon black, antioxidants, and cure ingredients and compared to tires having the identical ingredients plus 2 phr of 2,5-ditertiary-amyl hydroquinone. The cured properties are shown in Table 7.

TABLE 7

Vulcanizate Properties

| Property | Control | Plus 2 phr Modified Hydroquinone[1] |
|---|---|---|
| Tensile strength, MPa | 28.8 | 28.0 |
| Elongation at break, % | 510 | 473 |
| 300% Modulus, MPa | 16.4 | 17.1 |
| Instron tear at room temperature, N/inch | 1184 | 1325 |
| Instron tear 100° C., N/inch | 1680 | 1806 |
| Hot rebound, 100° C. (%) | 76.4 | 78.1 |

[1] 2,5-ditertiary-amyl hydroquinone

What is claimed is:

1. A sulfur curable rubber composition which is comprised of at least one of natural rubber and synthetic rubber and is characterized by containing, based on 100 parts by weight of said rubber, from about 0.5 to about 5 parts by weight of 2,5-diorganohydroquinone having the structure:

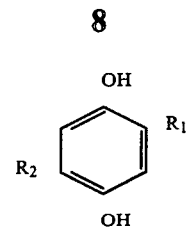

where $R_1$ and $R_2$ are the same or different hydrocarbon radicals containing from 1 to 20 carbon atoms selected from saturated alkyl and cycloalkyl radicals containing 3 to 20 carbon atoms and from aryl and hydrocarbon substituted aryl radicals (alkaryl radicals) and aralkyl radicals containing from 6 to 20 carbon atoms; wherein said rubber composition is prepared by mixing essentially all of the 2,5-diorganohydroquinone in the absence of sulfur and vulcanization accelerators in a first, nonproductive, stage, of a multiple stage rubber mixing process.

2. The rubber composition of claim 1 where said hydrocarbon radicals are selected from branched, saturated alkyl and cycloalkyl radicals containing 4 to 6 carbon atoms.

3. The rubber composition of claim 1 where said alkyl radicals are selected from methyl, ethyl, propyl, butyl, amyl, hexyl, heptyl, octyl, nonyl and decyl radicals and their isomeric forms.

4. The rubber composition of claim 3 where said radicals are tertiary radicals selected from tertiary butyl, amyl, hexyl, heptyl and octyl radicals.

5. The rubber composition of claim 1 where said 2,5-diorganohydroquinone is a ditertiaryalkylhydroquinone where its tertiary alkyl groups are saturated alkyl radicals selected from butyl, amyl and hexyl radicals.

6. The rubber composition of claim 1 where said 2,5-diorganohydroquinone is 2,5-ditertiaryamylhydroquinone.

7. The rubber compound of claim 1 where said synthetic rubber is selected from at least one of cis 1,4-polybutadiene, 3,4-polyisoprene, styrene/butadiene copolymers, styrene/isoprene/butadiene copolymers and butadiene/acrylonitrile copolymers and if used therein, then as a minor amount of EPDM rubber, butyl and/or halobutyl rubber.

8. The rubber composition of claim 6 where said synthetic rubber is selected from at least one of cis 1,4-polybutadiene, 3,4-polyisoprene, styrene/butadiene copolymers, styrene/isoprene/butadiene copolymers and butadiene/acrylonitrile copolymers and if used therein, then as a minor amount of EPDM rubber, butyl and/or halobutyl rubber.

9. A pneumatic rubber tire containing at least one component as the rubber composition of claim 1.

10. A pneumatic rubber tire having at least one of its carcass or sidewall components as containing the rubber composition of claim 6.

11. A pneumatic rubber tire having a tread composed of a sulfur cured rubber composition of claim 1.

12. The pneumatic rubber tire of claim 11 where the said rubber composition is a tread base in a tread cap/base construction.

13. A pneumatic rubber tire having a tread composed of a sulfur cured rubber composition of claim 4.

14. A pneumatic rubber tire having a tread composed of a sulfur cured rubber composition of claim 5.

15. A pneumatic rubber tire having a tread composed of a sulfur cured rubber composition of claim 6.

16. The pneumatic rubber tire of claim 15 where the said rubber composition is a tread base in a tread cap/base construction.

17. A pneumatic rubber tire having a tread composed of a sulfur cured rubber composition of claim 7.

* * * * *